United States Patent [19]

Ikeno

[11] Patent Number: 5,263,151
[45] Date of Patent: Nov. 16, 1993

[54] DATA TRANSFER CONTROLLER USING DUMMY SIGNALS FOR CONTINUED OPERATION UNDER INSIGNIFICANT FAULTY CONDITIONS

[75] Inventor: Motokiyo Ikeno, Tokyo, Japan

[73] Assignee: NEC Corporation, Tokyo, Japan

[21] Appl. No.: 470,214

[22] Filed: Jan. 25, 1990

[30] Foreign Application Priority Data

Jan. 26, 1989 [JP] Japan .................................. 1-16849

[51] Int. Cl.$^5$ .......................... G06F 11/00; G06F 13/28
[52] U.S. Cl. .................................. 395/575; 395/425; 371/62; 364/DIG. 1; 364/238.4; 364/242.3; 364/243.5; 364/265.1; 364/265.5; 364/267.6; 364/267.9; 364/268.9
[58] Field of Search .............................. 395/425, 575; 364/DIG. 1, DIG. 2; 371/62

[56] References Cited

U.S. PATENT DOCUMENTS

| | | | |
|---|---|---|---|
| 4,131,945 | 12/1978 | Richardson et al. | 395/575 |
| 4,716,523 | 12/1987 | Burrus, Jr. et al. | 395/425 |
| 5,091,870 | 2/1992 | Datsko et al. | 364/565 |

Primary Examiner—Paul V. Kulik
Assistant Examiner—Matthew C. Fagan
Attorney, Agent, or Firm—Foley & Lardner

[57] ABSTRACT

In a data processing system, a processor issues a transfer request through a data transfer controller to an extended buffer memory to elicit an accept signal. If the accept signal is not returned from the buffer memory within a specified period, a first dummy signal is generated instead, and the controller notifies this fact to the processor and waits for the return of an advance notice from the buffer memory. If the advance notice is not returned within a specified period, a second dummy signal is generated instead to allow the controller to proceed to transfer data read out of the buffer memory to a main memory. The controller then waits for the return of a status report signal from the buffer memory. If the status report signal is not received within a specified period, a third dummy signal is generated instead to allow the controller to proceed to examine a status signal from the buffer memory to determine whether the transferred data has been correctly read out of the buffer memory. A reply signal is applied to the processor indicating the result of the determination.

4 Claims, 1 Drawing Sheet

DATA TRANSFER CONTROLLER USING DUMMY SIGNALS FOR CONTINUED OPERATION UNDER INSIGNIFICANT FAULTY CONDITIONS

BACKGROUND OF THE INVENTION

The present invention relates generally to data processors, and more specifically to a data transfer controller for a data processor of the type which is provided with an extended buffer memory in addition to the main memory.

In a supercomputer involving large scale scientific calculations, it is sometimes impossible to store all the necessary data simultaneously in the main memory. As a result, a large capacity extended buffer memory has been additionally provided to permit high speed data transfer. If a fault is detected in the extended buffer memory during a data transfer mode, the controlling program is notified of this fact to cancel instructions which are being performed or have been put in a queue waiting to be executed. The controlling program segregates the extended buffer memory from the system to fix the fault, and after recovery the extended buffer memory is integrated again with the system.

However, due to the cancellation of instructions, all flip-flops which are set for the cancelled instructions must be cleared and reset with the next instructions. This adds to significant complexity to the control algorithm and results in an increase in the amount of hardware.

SUMMARY OF THE INVENTION

It is therefore an object of the present invention to continue data transfer operation in the presence of an insignificant faulty condition in the extended buffer memory by issuing a dummy signal instead of a response signal if the latter is not returned from the extended buffer memory within a specified time interval from the instant a data request is applied to the buffer memory.

According to the present invention, a data transfer controller is provided for a data processing system having a processor, a main memory and an extended buffer memory. The data processor comprises a request control circuit for applying a request signal to the buffer memory in response to a request from the processor, to cause the buffer memory to return a first response signal. A first counter is provided for incrementing a count in response to the application of the request signal to the buffer memory. The first counter is reset in response to the first response signal or generates a time-out signal if the count reaches a prescribed value. A first dummy signal is generated in response to the time-out signal from the first counter. A second time-out counter is started in response to the occurrence of the first response signal or the first dummy signal, and this second counter is reset in response to a second response signal from the buffer memory, or generates a time-out signal if the second counter reaches a prescribed value. A second dummy signal is generated in response to the time-out signal from the second counter. A data transfer circuit is responsive either to the second response signal or the second dummy signal for transferring data read out of the buffer memory to the main memory. A third time-out counter is started immediately following the transfer of data to the main memory. The third counter is reset in response to a third response signal from the buffer memory, or generates a time-out signal if the third counter reaches a prescribed value. A third dummy signal is generated in response to the time-out signal from the third counter. A reply controller is responsive to the third response signal or the third dummy signal to examine a status signal supplied from the buffer memory to determine whether the transferred data has been correctly read out of the buffer memory and applies a reply signal to the processor indicating the result of the determination.

In operation, if the first response signal is not returned from the buffer memory within the time-out period of the first counter, the first dummy signal is generated instead, and the data transfer controller notifies this fact to the processor and waits for the return of the second response signal from the buffer memory. If the second response signal is not returned within the time-out period of the second counter, the second dummy signal is generated instead to allow the controller to proceed to transfer data read out of the buffer memory to the main memory. The controller then waits for the return of the third response signal from the buffer memory. If the third response signal is not received within the time-out period of the third counter, the third dummy signal is generated instead to allow the controller to proceed to examine the status signal from the buffer memory to determine whether the transferred data has been correctly read out of the buffer memory and send the reply signal to the processor.

BRIEF DESCRIPTION OF THE DRAWINGS

The present invention will be described in further detail with reference to the accompanying drawings, in which.

DETAILED DESCRIPTION

Figure 1:
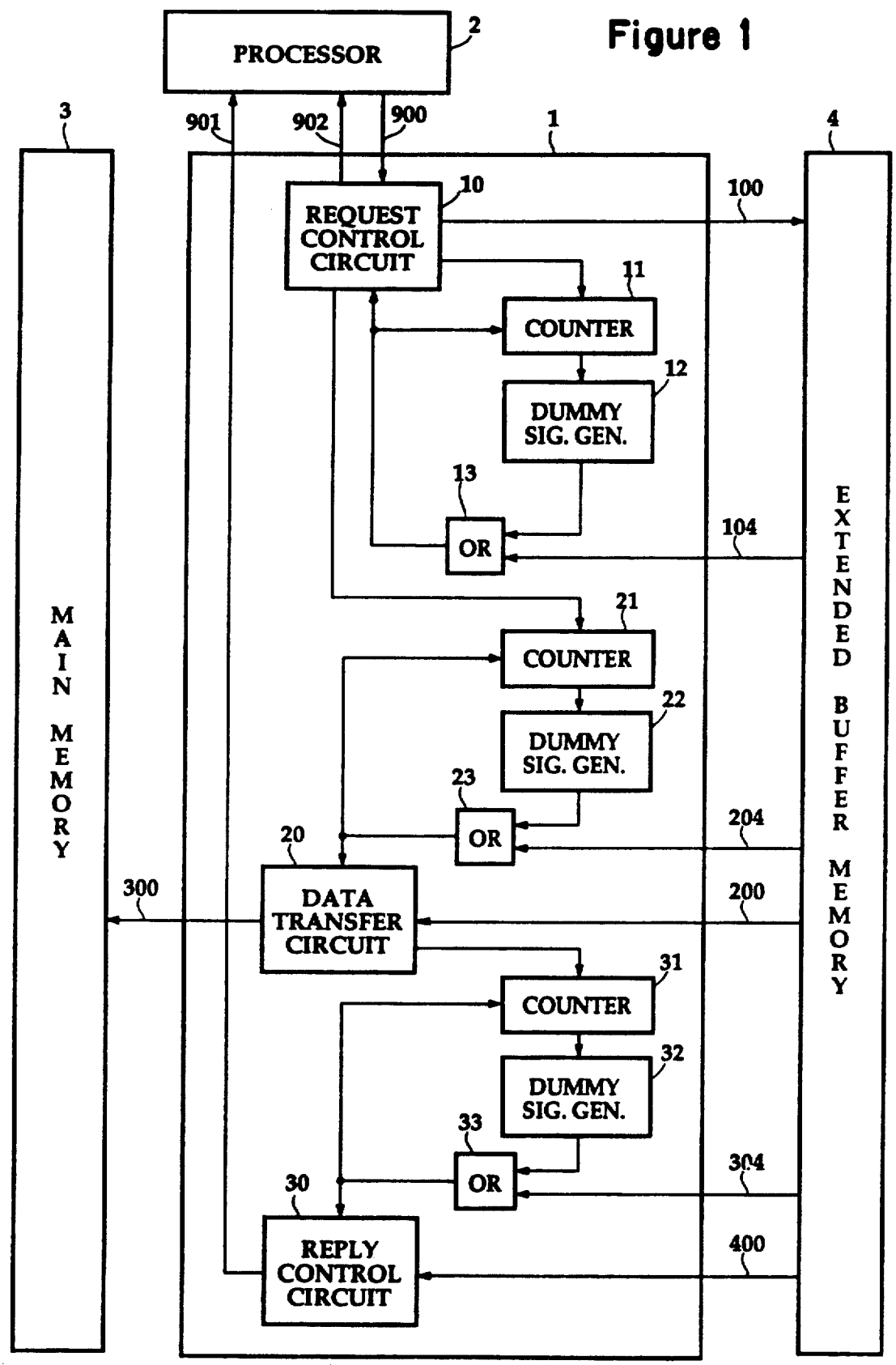
FIG. 1 is a block diagram of a data processing system according to the present invention.

Referring now to FIG. 1, the data processor of the present invention generally comprises a processor 2, a main memory 3, an extended buffer memory 4, and a data transfer controller 1 which cooperates with processor 2 and memories 3 and 4.

Data transfer controller 1 comprises a request control circuit 10, a data transfer circuit 20 and a reply control circuit 30. Request control circuit 10 is connected by a data transfer request bus 900 to the processor 2 to receive a data transfer request signal. In response to this transfer request signal, request controller 10 generates a read address identifying the location of the necessary data to be read out of memory 4, as well as a write address identifying the location of the read data to be written into memory 3. It further generates a signal indicating the amount of the data to be transferred from memory 4 to memory 3. These signals are sent from request controller 10 on bus 100 to the extended buffer memory 4 as a read request signal.

On receiving this read request signal, buffer memory 4 returns an accept signal on line 104 if there is no trouble in the buffer memory 4. In preparation for such a faulty condition, request control circuit 10 activates a time-out counter 11. If an accept signal is returned from buffer memory 4 within the time-out period of counter 11, it is passed through an OR gate 13 to request control circuit 10 to reset the counter 11 and activates a time-out counter 21 in preparation for receiving an advance notice signal on line 204 from buffer memory 4, indicating that data will be read out of buffer memory 4 and transferred through bus 200.

If the accept signal is not received from buffer memory 4 before the end of the time-out period of counter 11, a dummy signal generator 12 is activated by counter 11 to generate a dummy accept signal, which is applied through OR gate 13 to the reset input of the counter 11 on the one hand, and supplied, on the other, to the request control circuit 10. In response to this dummy signal, request control circuit 10 informs this fact to the processor 2, on line 902 indicating that there is a faulty condition in the buffer memory 4 and activates the time out counter 21 in preparation for receiving an advance notice signal on line 204 from the buffer memory 4.

The advance notice signal is one which is generated just prior to the readout of data. This signal is passed through an OR gate 23 to the data transfer circuit 20, as well as to the reset terminal of the time-out counter 21. Subsequently, data is read out of the buffer from the specified address location, forwarded through input bus 200 and passed through data transfer circuit 20 to the main memory 3 through output bus 300. If no advance notice is received within the time-out period of counter 21, the latter activates a dummy signal generator 22 to cause it to supply a dummy advance notice through OR gate 23 to data transfer circuit 20 as well as to counter 21.

At the end of a data transfer operation, data transfer circuit 200 activates a third time-out counter 31 in preparation for a status report signal which will be transmitted through bus 304 from buffer memory 4 simultaneously with a status signal transmitted on bus 400. The status report signal is applied through an OR gate 33 to the reset input of the time-out counter 31 as well as to the reply control circuit 30, and the status signal is supplied to the reply control circuit 30. Reply control circuit 30 examines the status signal and determines if the data has been correctly read out from buffer memory 4. Circuit 30 then sends a reply signal on bus 901 to the processor 2, indicating the result of the determination.

If buffer memory 4 fails to send a status report signal within the time-out period of counter 31, the latter causes a dummy signal generator 32 to issue a dummy status report signal to OR gate 33, so that counter 31 is reset and the reply control circuit 30 can proceed to examine a status signal sent with the failed status report signal.

Therefore, data transfer operation is not interrupted by insignificant failures of the extended buffer memory 4, without substantially increasing the hardware.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A data transfer controller for a data processing system having a processor, a main memory and an extended buffer memory, comprising:
    request control means for applying a request signal to said buffer memory in response to a request from said processor to cause said buffer memory to return a first response signal;
    first time-out counter means for incrementing a first count by a unit value in response to the application of said request signal to said buffer memory, and resetting said first count in response to said first response signal or generating a first time-out signal if said first count reaches a prescribed value;
    a first dummy signal generator for generating a first dummy signal in response to said first time-out signal;
    second time-out counter means for incrementing a second count by a unit value in response to said first response signal or said first dummy signal, and resetting said second count in response to a second response signal from said buffer memory, or generating a second time-out signal if said second count reaches a prescribed value;
    a second dummy signal generator for generating a second dummy signal in response to said second time-out signal;
    data transfer means responsive to said second response signal or said second dummy signal for transferring data read out of said buffer memory to said main memory;
    third time-out counter means for incrementing a third count by a unit value following the transfer of data to said main memory, and resetting said third count in response to a third response signal from said buffer memory, or generating a third time-out signal if said third count reaches a prescribed value;
    a third dummy signal generator for generating a third dummy signal in response to said third time-out signal; and
    reply control means responsive to said third response signal or said third dummy signal for examining a status signal supplied from said buffer memory to determine whether said transferred data has been correctly read out of said buffer memory and applying a reply signal to said processor indicating a result of the determination.

2. A data transfer controller as claimed in claim 1, wherein said request control means notifies said processor that a faulty condition exists in said extended buffer memory in response to said first dummy signal.

3. A data processing system comprising:
    a processor for issuing a data transfer request;
    a main memory;
    an extended buffer memory;
    request control means for applying a data read request signal to said extended buffer memory in response to said data transfer request from said processor to cause said buffer memory to return an accept signal;
    a first time-out counter means for incrementing a first count by a unit value in response to the application of said request signal to said buffer memory, and resetting said first count in response to said accept signal or generating a first time-out signal if said first count reaches a prescribed value;
    a first dummy signal generator for generating a first dummy signal in response to said first time-out signal;
    second time-out counter means for incrementing a second count by a unit value in response to said accept signal or said first dummy signal, and resetting said second count in response to an advance notice supplied from said buffer memory, or generating a second time-out signal if said second count reaches a prescribed value;
    a second dummy signal generator for generating a second dummy signal in response to said second time-out signal;

data transfer means responsive to said advance notice or said second dummy signal for transferring data read out of said buffer memory to said main memory;

third time-out counter means for incrementing a third count by a unit value following the transfer of data to said main memory, and resetting, said third count in response to a status report signal from said buffer memory, or generating a third time-out signal if said third count reaches a prescribed value;

a third dummy signal generator for generating a third dummy signal in response to said third time-out signal; and reply control means responsive to said status report signal or said third dummy signal for examining a status signal supplied from said buffer memory to determine whether said transferred data has been correctly read out of said buffer memory and applying a reply signal to said processor indicating a result of the determination.

4. A data processing system as claimed in claim 3, wherein said request control means notifies said processor that a faulty condition exists in said extended buffer memory in response to said first dummy signal.

* * * * *